United States Patent [19]

Arakawa

[11] Patent Number: 5,138,474
[45] Date of Patent: Aug. 11, 1992

[54] LIQUID CRYSTAL DISPLAY WITH COMPENSATOR HAVING TWO FILMS WITH POSITIVE AND NEGATIVE INTRINSIC BIREFRINGENCE, RESPECTIVELY

[75] Inventor: Kohei Arakawa, Kanagawa, Japan

[73] Assignee: Fuji Photo Film Co., Ltd., Kanagawa, Japan

[21] Appl. No.: 603,483

[22] Filed: Oct. 26, 1990

[30] Foreign Application Priority Data

Oct. 27, 1989 [JP] Japan .................................. 1-281247
Sep. 13, 1990 [JP] Japan .................................. 2-242982

[51] Int. Cl.⁵ ........................................... G02F 1/1335
[52] U.S. Cl. ..................................................... 359/73
[58] Field of Search ....................... 350/347 R, 339 R; 359/73

[56] References Cited

U.S. PATENT DOCUMENTS

| | | | |
|---|---|---|---|
| 4,852,976 | 8/1989 | Suzuki | 350/339 R |
| 4,889,412 | 12/1989 | Clerc et al. | 350/339 R |
| 4,909,606 | 3/1990 | Wada et al. | 350/347 R |
| 4,957,349 | 9/1990 | Clerc et al. | 350/347 R |
| 4,973,137 | 11/1990 | Kozaki | 350/339 R |
| 4,984,874 | 1/1991 | Yamamoto et al. | 350/339 R |

FOREIGN PATENT DOCUMENTS

| | | |
|---|---|---|
| 0367288 | 5/1990 | European Pat. Off. . |
| 0372973 | 6/1990 | European Pat. Off. . |
| 0379315 | 7/1990 | European Pat. Off. . |
| 0393191 | 10/1990 | European Pat. Off. . |

Primary Examiner—Stanley D. Miller
Assistant Examiner—Anita Pellman Gross
Attorney, Agent, or Firm—Sughrue, Mion, Zinn, Macpeak & Seas

[57] ABSTRACT

A liquid crystal display comprising a liquid crystal element, at least two birefringent films and a pair of polarizing sheets so arranged that said element and said films are held therebetween, said liquid crystal element comprising a cell composed of two sheets of substrates and a twisted nematic liquid crystal, each substrate being provided with an electrode on one surface thereof, said substrates being arranged so that the electrodes are opposed to each other and said twisted nematic liquid crystal being held between said electrodes, characterized in that said birefringent films are composed of at least one uniaxially stretched film of a polymer having a positive intrinsic birefringence and light transmission properties and at least one uniaxially stretched film of a polymer having a negative intrinsic birefringence and light transmission properties.

6 Claims, 2 Drawing Sheets

LIQUID CRYSTAL DISPLAY WITH COMPENSATOR HAVING TWO FILMS WITH POSITIVE AND NEGATIVE INTRINSIC BIREFRINGENCE, RESPECTIVELY

FIELD OF THE INVENTION

This invention relates to a liquid crystal display using twisted nematic liquid crystals or cholesteric liquid crystals.

BACKGROUND OF THE INVENTION

The range of uses of liquid crystal displays has been increasing because of many merits, such as possibility of direct connection to IC circuits at low voltage and at low power, a wide variety of display functions, high productivity and possibility of weight reduction.

Twisted nematic liquid displays wherein the twist angle of the liquid crystal molecules is 160 degrees or greater (hereinafter referred to as STN-LID) are practically used for dot matrix type liquid crystal displays used for office appliances such as word processors, personal computers, etc. at present and hold the first place. This is because a STN-LCD can keep high contrast even during high multiplex driving in comparison with conventional twisted nematic liquid displays wherein the twist angle is 90 degrees (TN-LCD). However, when a STN-LCD is used, it is impossible to whiten the color tone of the appearance of the displays, and the color tone is greenish to yellowish red, and hence the displays using STN are unsuitable for use as devices.

There has been proposed a method wherein one or more layers of optical anisotropic materials are provided between a pair of polarizing sheets to solve the problems mentioned above. When straight polarized light passed through one sheet of a pair of said polarizing sheets is passed through the liquid crystal layer of a liquid crystal element and the optical anisotropic materials, there is obtained elliptic polarized light nearly arranged in the direction of the major axis in the wavelength region of about 400 to about 700 nm. As a result, white light is obtained without causing the screening of light in a specific wavelength region when passed through the other sheet of the pair of said polarizing sheets.

There were patent applications filed relating to phase difference films for use in the removal of coloring of a STN-LCD. For example, there are disclosed in JP-A-63-189804 (the term "JP-A" as used herein means an "unexamined published Japanese patent application") uniaxially stretched polycarbonate films having retardation values (a product of a birefringence and a film thickness) of 200 to 350 nm or 475 to 625 nm when measured with a polarization microscope. JP-A-63-167304 discloses film laminates obtained by laminating two or more uniaxially stretched films or sheets having birefringence properties so as to allow the optical major axes to fall at right angles with each other. When two sheets of double refractive films (retardation values being $R_1$ and $R_2$, respectively) are laminated onto each other so as to allow optical major axes to fall at right angles with each other, a phase difference film having a retardation of $|R_1-R_2|$ as a laminate can be obtained. Accordingly, the aforesaid invention has an advantage in that a value of $|R_1-R_2|$ can be controlled to a range of 90 to 180 nm, 200 to 350 nm or 475 to 625 nm even when $R_1$ and $R_2$ are large retardation values.

The above inventions are intended to solve the problem with regard to the coloring of STN-LCD. The aforesaid problem has been greatly improved and a display near monochromatic display has been obtained. Further, methods wherein a high-molecular birefringent film (hereinafter referred to as phase difference film) is used, have a merit in cost, and the film has come to be more in request.

The liquid crystal display using the phase difference film achieves color removal when seen from the direction vertical to the screen. However, when it is seen from an oblique direction, the disadvantage generally associated with a STN-LCD relating to viewing angle characteristics, i.e., coloring or disappearance of display with a slight change of viewing angle, becomes pronounced. This is a great problem to a STN-LCD.

SUMMARY OF THE INVENTION

The inventors have conducted extensive studies to improve greatly the viewing angle characteristics of a STN-LCD, thus providing a novel liquid crystal display. As a result, this invention has been accomplished.

That is, the present invention provides:

(1) a liquid crystal display comprising a liquid crystal element, at least two birefringent films and a pair of polarizing sheets so arranged that said element and said films are held therebetween, said liquid crystal element comprising a cell composed of two sheets of substrates and a twisted nematic liquid crystal, each substrate being provided with an electrode on one surface thereof, said substrates being arranged so that the electrodes are opposed to each other and said twisted nematic liquid crystal being held between said electrodes, characterized in that said birefringent films are composed of at least one uniaxially stretched film of a polymer having a positive intrinsic birefringence and light transmission properties and at least one uniaxially stretched film of a polymer having a negative intrinsic birefringence and light transmission properties;

(2) a liquid crystal display as described in (1) above, wherein said uniaxially stretched film of a polymer having a positive intrinsic birefringence and light transmission properties and said uniaxially stretched film of a polymer having a negative intrinsic birefringence and light transmission properties are laminated onto each other so as to allow their optic axes to fall at right angles with each other.

Figure 1:
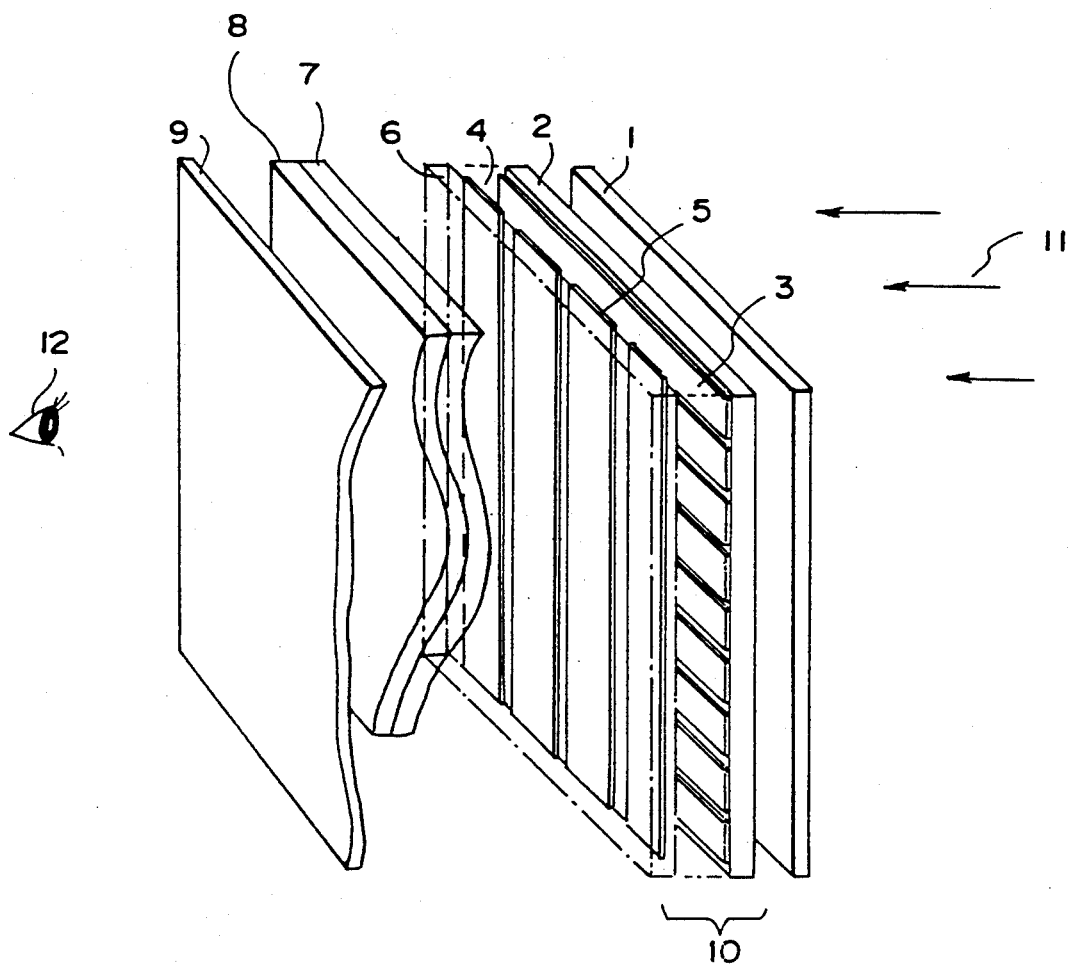
FIG. 1 is a perspective view of the liquid crystal display used in Example of the present invention.

Numerals in the drawings represent the following members.

1: first polarizing sheet,
2: first substrate,
3: transparent electrode,
4: liquid crystal layer,
5: transparent electrode,
6: second substrate, 7: uniaxially stretched film having a positive intrinsic birefringence,
8: uniaxially stretched film having a negative intrinsic birefringence,
9: second polarizing sheet,
10: liquid crystal cell (STN),
11: direction of light from a light source, observer, 20: horizontal axis,
21: polarization axis of the first polarizing sheet,
22: polarization axis of the second the polarizing sheet,
23: rubbing direction of the transparent electrode 3 substrate,
24: rubbing direction of the transparent electrode 5 substrate,
25: twist angle of the liquid crystal molecules,
26: stretching axis of the uniaxially stretched film having a positive intrinsic birefringence,
27: stretching axis of the uniaxially stretched film having a negative intrinsic birefringence,
28: angle between the horizontal axis an the polarization axis of first polarizing sheet,
29: angle of the rubbing direction of transparent electrode 3 to the polarization axis of the first polarizing sheet,
30: angle of the rubbing direction of the transparent electrode 5 substrate to the stretching axis of the uniaxially stretched film having a positive intrinsic birefringence,
31: angle between the stretching axis of the uniaxially stretched film having a positive intrinsic birefringence and the stretching axis of the uniaxially stretched film having a negative intrinsic birefringence,
32: angle between the horizontal axis and the polarization axis of the second polarizing sheet,
41: film (a),
42: film (b),
43: stretching axis of film (a),
44: stretching axis of film (b)
45: incident direction at an inclination in the direction $\theta = 0°$,
46: normal direction of film.

DETAILED DESCRIPTION OF THE INVENTION

The inventors have made studies whether the problems associated with the viewing angle of a STN-LCD is improved by changing the refractive index of the phase difference film in a three-dimensional direction. Concretely, it has been found that the viewing angle dependence of a retardation (Re) defined as a product of a birefringence ($\Delta n$) of a film and a film thickness (d) is closely related to the viewing angle of LCD. The inventors have made studies on the viewing angle dependence of a retardation and found that the viewing angle can be greatly improved by inserting a film having an optic axis substantially in the normal direction, more specifically, a laminated film of a biaxially stretched film having a negative intrinsic birefringence and a uniaxially stretched film having a positive intrinsic birefringence between a liquid crystal cell and a polarizing sheet. A patent application was previously filed on the basis of this finding (Japanese Patent Application No. 63-278593 corresponding to U.S. Ser. No. 07/431,500). The inventors have further made studies and found that the viewing angle in a specific direction is still insufficient, though the viewing angle is greatly improved as a whole. Accordingly, studies have been further made and there has been found that viewing angle characteristics in the liquid crystal displays can be remarkably improved by inserting a laminate of a uniaxially stretched film of a polymer having a positive intrinsic birefringence and a uniaxially stretched film of a polymer having a negative intrinsic birefringence between a liquid crystal cell and a polarizing sheet. This invention has been accomplished on the basis of this finding.

All film materials currently used for phase difference films have positive intrinsic birefringence values. The following relationship between the refractive indexes of the longitudinally uniaxially stretched film of a polymer having a positive intrinsic birefringence is given.

$$n_{MD} > n_{TD} \geq n_{ND}$$

wherein $n_{MD}$ is a refractive index in the direction of the stretching axis, $n_{TD}$ is a refractive index in the direction perpendicular to the stretching axis, and $n_{ND}$ is a refractive index in the normal direction.

Accordingly, when incident light enters at right angles with the surface of the film, the following relationship is given:

$$Re = (n_{MD} - n_{TD})d$$

When incident light is passed through a plane perpendicular to the stretching direction, birefringence is changed in the range of from $\Delta n = n_{MD} - n_{TD}$ to $\Delta n = n_{MD} - n_{ND}$ with the change of incident light. Since $n_{MD} - n_{TD} \leq n_{MD} - n_{ND}$, $\Delta n$ is not changed or is increased when incident light enters at an inclination. Since the light path length is increased by the inclination of incident light, $Re = \Delta n \cdot d$ is drastically increased with inclined incidence. When incident light enters at an inclination from the direction of the normal toward the direction of stretching axis, $\Delta n$ is rapidly changed from $n_{MD} - n_{ND}$ to $n_{Nn} - n_{TD}$ and hence a decrease thereof cannot be sufficiently corrected even when light the path length is increased. As a result, $Re = \Delta n \cdot d$ is rapidly decreased with inclined incident light. In principle, the rate of change in retardation is minimum when the uniaxially stretched film satisfies the following relationship.

$$n_{MD} > n_{TD} = n_{ND}$$

However, Re is greatly changed with an increase in the light path length accompanying the increase of the inclination of incident light even when the above relationship is satisfied.

It has been found that the laminate of a uniaxially stretched film of a polymer having a positive intrinsic birefringence and a uniaxially stretched film of a polymer having a negative intrinsic birefringence according to the present invention has such an excellent effect that it can be freely controlled so as to function as a film which scarcely causes a change in its retardation or properly varies its retardation to omnidirectional incidence without causing the extinction of its retardation in the normal direction by the addition of the retardations of said polymer film having a positive intrinsic birefringence and said polymer film having a negative intrinsic birefringence to each other. Further, it has been found that the effect obtained by the laminate is particularly remarkable when a uniaxially stretched film of a polymer having a positive intrinsic birefringence and a uniaxially stretched film of a polymer having a negative intrinsic birefringence are laminated onto each other so as to allow their stretching axes to fall at right angles with each other. Such an effect, i.e., a film laminate scarcely causing a change in its retardation to omnidirectional incidence cannot be obtained when a uniaxially stretched film of a polymer having a positive intrinsic birefringence and a uniaxially stretched film of a polymer having a positive intrinsic birefringence are laminated onto each other so as to allow their stretching axes to fall at right angles with each other, or when a uniaxially stretched film of a polymer having a negative intrinsic birefringence and a uniaxially stretched film of a polymer having a negative intrinsic birefringence are laminated onto each other so as to allow their stretching axes to fall at right angles with each other. The above-described excellent effect can be obtained only by the laminate of the present invention.

In the laminate of a uniaxially stretched film of a polymer having a positive intrinsic birefringence and a uniaxially stretched film of a polymer having a negative intrinsic birefringence according to the present invention, the laminate can be freely controlled so that the viewing angle dependence of its retardation can be removed almost completely or its retardation can be properly varied by controlling the molecule orientation level of each uniaxially stretched film. Accordingly, since the viewing angle characteristics of the retardation can be adapted according to the optical characteristics of a STN-LCD, it has been found that the viewing angle of the STN-LCD can be greatly widened when the laminate as a phase difference film is provided between a polarizing sheet and a liquid crystal cell in the STN-LCD.

In greater detail, the present invention provides a liquid crystal display using twisted nematic liquid crystals having a twist angle of at least 90°, particularly 180° to 330° or cholesteric liquid crystals which is free from a coloting phenomenon arising from the birefringence properties of the liquid crystal cell while exhibiting a widened viewing angle and an enlarged high contrast area. With regard to the retardation of the film in the normal direction, there can be obtained an addition value of the retardation of a uniaxially stretched film of a polymer having a positive intrinsic birefringence and the retardation of a uniaxially stretched film of a polymer having a negative intrinsic birefringence. However, when the stretching axis of the uniaxially stretched film of a polymer having a positive intrinsic birefringence accords with that of the uniaxially stretched film of a polymer having a negative intrinsic birefringence, retardation is cancelled. Hence, such a case is not preferred. Accordingly, it is desirable that the stretching axes of the film laminate are arranged so as to allow the axes to fall at right angles with each other. More specifically, it is most preferred that the relative angle is 70° to 110°. However, when the film having a positive intrinsic birefringence and the film having a negative intrinsic birefringence are arranged through a liquid crystal cell, other embodiments may be made. Namely, the films are not laminated, but may be provided on both sides of the liquid crystal cell. One film may be used to serve as a protective film on the liquid crystal cell side of the polarizing sheet. When one film is used to serve as a protective film for the polarizing sheet, there are such merits that the viewing angle can be widened and cost can be reduced.

The term "film" as used herein refers to not only a film in a common sense but also a coated film provided on a substrate.

The term "uniaxially stretched film" as used herein refers to not only a film stretched in one direction in a strict sense, but also a film somewhat exhibiting biaxial orientation, so long as it essentially functions as a uniaxially stretched film.

Hence, the method of stretching is not restricted at all, including a transverse uniaxial stretching method by tentering, a longitudinal uniaxial stretching method using a difference in peripheral speeds between rollers (shrinkage in the width direction is sometimes permitted and sometimes limited).

In the present invention, the polymer having light transmission properties and a positive intrinsic birefringence is preferably achromatic and has a light transmittance of preferably at least 70%, more preferably at least 90%. The term "intrinsic birefringence ($\Delta n°$)" as used herein means birefringence when molecule are ideally orientated in one direction. The intrinsic birefringence can be approximately represented by the following formula.

$$\Delta n° = \frac{2\pi}{9} \frac{dN}{M} \frac{(n^2 + 2)^2}{n} \Delta \alpha$$

wherein $\pi$ is the circular constant, d is a density, N is the Avogadro number, n is an average refractive index, and $\Delta \alpha = \alpha_{11} - \alpha\perp$ (wherein $\alpha_{11}$ is a polarizability per monomer in the direction of the molecular chain axis of the polymer and $\alpha\perp$ is a polarizability in the direction perpendicular to the molecular chain axis of the polymer.

Preferred examples of polymers for use in preparing films having a positive intrinsic birefringence include, but are limited to, polycarbonates, polyarylates, polyethylene terephthalate, polyether sulfone, polyphenylene sulfide, polyphenylene oxide, polyallyl sulfone, polyamide-imides, polyimides, polyolefins, polyvinyl chloride, cellulose and polyesters. Among them, polycarbonates, polyarylates and polyesters are particularly preferred, because planar homogeneous films having high intrinsic birefringence can be easily prepared by solution casting.

The above-described polymers may be homopolymers as well as copolymers, derivatives thereof and blends.

In the present invention, the film having light transmission properties and a negative intrinsic birefringence is preferably achromatic and has a light transmittance of preferably at least 70%, more preferably at least 90%. Preferred examples of polymers for use in preparing films having a negative intrinsic birefringence include, but are not limited to, styrene polymers, acrylic ester polymers, methacrylic ester polymers, acrylonitrile polymers and methacrylonitrile polymers with polystyrene polymers being most preferred from the viewpoints of the large absolute value of intrinsic birefringence, excellent transparency with no coloring and easy processing into films by solution casting.

The styrene polymers include homopolymers of styrene and styrene derivatives, copolymers of styrene and styrene derivatives and blends thereof.

Examples of the styrene derivatives include, but are not limited to, a-methylstyrene, o-methylstyrene, p-methylstyrene, p-chlorostyrene, p-nitrostyrene, p- aminostyrene, p-carboxylstyrene, p-phenylstyrene and 2,5-dichlorostyrene. Any of the compounds can be used as comonomers for use in the preparation of the copolymers of styrene and styrene derivatives (hereinafter referred to as ST) without particular limitation, so long as the resulting copolymers and blends have satisfactory film forming properties. Though they have a phase separation structure, they can be used in the present invention, so long as transparency is not deteriorated. Examples of the copolymers include ST/acrylonitrile, ST/methacrylonitrile, ST/methyl methacrylate, ST/ethyl methacrylate, ST/α-chloroacrylonitrile, ST/methyl acrylate, ST/ethyl acrylate, ST/butyl acrylate, ST/acrylic acid, ST/methacrylic acid, ST/butadiene, ST/isoprene, ST/maleic anhydride and ST/vinyl acetate copolymers, α-methylstyrene/acrylonitrile, α-methylstyrene/methacrylonitrile, α-methylstyrene/methylmethacrylate and styrene/styrene derivative copolymers. In addition to the above copolymers, terpolymers such as ST/α-methylstyrene/acrylonitrile and ST/α-methylstyrene/methyl methacrylate, and higher order polymers can be used. The polymer blends include blends of polymers selected from the above-described styrene homopolymers, styrene derivative homopolymers and styrene/styrene derivative copolymers and, in addition, blends of polymers comprising styrene and styrene derivative (hereinafter referred to as PST) and polymers containing no PST. Examples of the polymer blends include PST/butyl cellulose and PST/coumarone resin.

The styrene polymers can be satisfactorily utilized by increasing either the thickness or the stretch ratio, even though the absolute value of the intrinsic birefringence is small. In order to be not restricted therefrom, the intrinsic birefringence is preferably at least 0.02, more preferably at least 0.04 in terms of the absolute value. The glass transition point (Tg) of the polymers is preferably not lower than 100° C., more preferably not lower than 110° C., still more preferably not lower than 115° C. to prevent the orientation of the orientated molecules by stretching from being relaxed by temperature rise during the course of the preparation of LCD or display thereto.

The thickness of the film having birefringence is preferably in the range of 10μ to 1 mm, though there is no particular limitation with regard to the thickness of the film.

The present invention is now illustrated in greater detail by way of the following examples, but it should be understood that the present invention is not deemed to be limited thereto.

EXAMPLE 1

A polycarbonate having a molecular weight of about 100,000 was dissolved in methylene dichloride solvent to prepare a 20% solution. The solution was cast on a steel drum and continuously stripped off to obtain a transparent polycarbonate film (hereinafter referred to as PC film) having a thickness of 90 μm, a width of 500 mm, a Tg of 155° C. and an intrinsic birefringence (Δn°) of 0.10. The film was 16% stretched by longitudinal uniaxial stretching at 170° C. using rollers having different peripheral speeds to obtain a film (a).

Separately, polystyrene (molecular weight: about 200,000, Tg: 102° C., Δn° : −0.10) was dissolved in methylene dichloride to prepare a 25% solution. The solution was cast on a steel drum and continuously stripped off to obtain a polystyrene film (PSt film) having a thickness of 90 μm and a width of 500 mm. The film was 17% stretched by longitudinal uniaxial stretching at 90° C. using rollers having different peripheral speeds to obtain a film (b).

Figure 3:
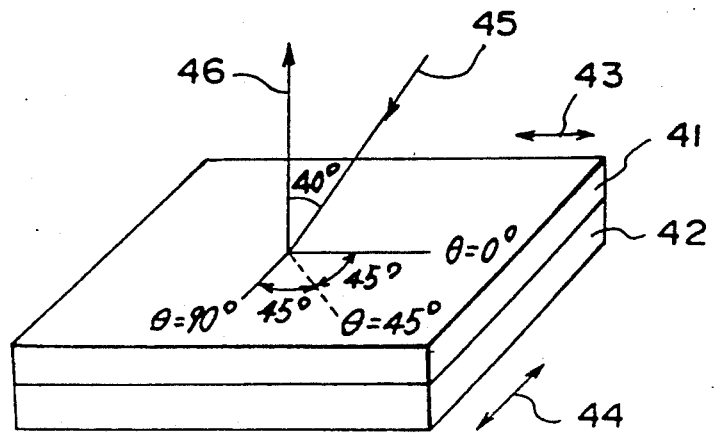
FIG. 3 shows schematically the direction of incidence of a laser beam of 632.8 nm when the optical characteristics of the laminate of film (a) and film (b) are measured.

The films (a) and (b) were laminated onto each other by means of an acrylic adhesive so as to allow their stretching axes to fall at right angles with each other. The direction of the stretching axis of the film (a) was referred to as $\theta=0$ and the direction of the stretching axis of the film (b) was referred to as $\theta=90°$. Retardation Re (40) was measured when incident light entered at an inclination at an angle of 40° with the normal direction of the film laminate in the direction of $\theta=0$, $\theta=45°$ and $\theta=90°$ (FIG. 3). Retardation Re(0) in the normal direction was also measured. The rate of change in retardation $|Re(0)-Re(40)|\div Re(0)|$ was calculated. The measurement of retardation was made by using Ellipsometer AEP-100 (manufactured by Shimazu Corp.). The light source used was a light beam having a wavelength of 632.8 nm. The measurement results are shown in Table 1.

Figure 2:
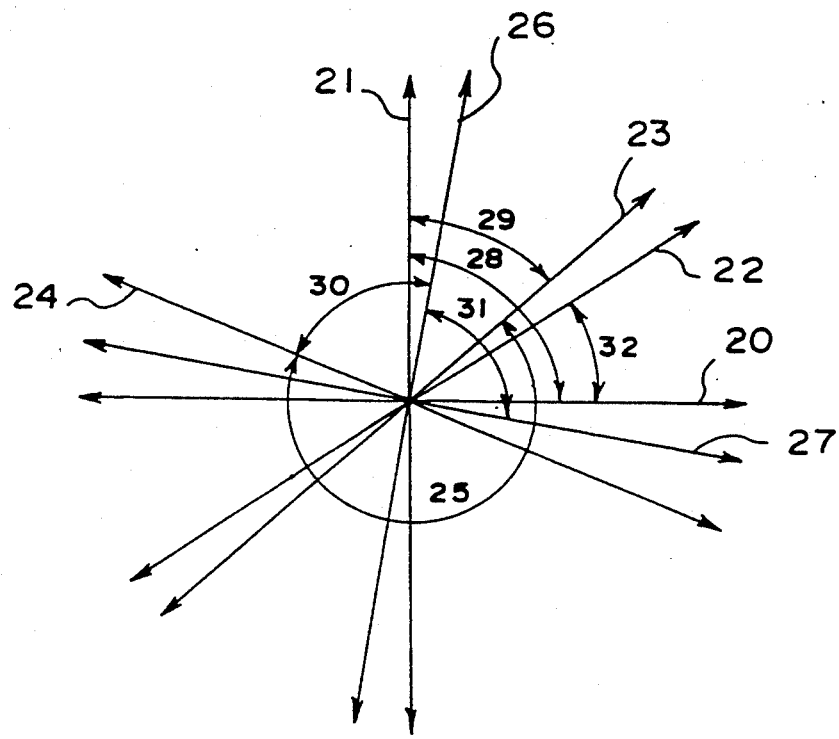
FIG. 2 shows schematically the relationship of the axes of the liquid crystal display according to the present invention.

A liquid crystal display used in this Example is illustrated by referring to FIG. 1 and FIG. 2.

FIG. 1 is a perspective view of the liquid crystal display and shows schematically the structure thereof. The display has such a structure that a liquid crystal cell 10 and the uniaxially stretched films 7,8 having positive and negative intrinsic birefringence values are held between two sheets of polarizing sheets 1,9 opposed to each other, said liquid crystal cell 10 comprising two sheets of substrates 2,6, two transparent electrodes 3,5 and a liquid crystal layer 4 held between said electrodes, and said films being interposed between said liquid crystal cell and the polarizing sheet 9 which is provided on the side of an observer.

FIG. 2 shows schematically the relationship of the axes of the liquid crystal display. The relative angle between the horizontal axis 20 and the polarization axis 21 of the first polarizing sheet is 90° and the relative angle between the horizontal axis and the polarization axis 22 of the second polarizing sheet is 40°. Further, the relative angle between the polarization axis 21 of the first polarizing sheet and the rubbing direction 23 of the transparent electrode 3 substrate is 45°. The twist angle 25 of the liquid transparent electrode 3 substrate and the rubbing direction 24 of the transparent electrode 5 substrate. In this example, the twist angle is 240°.

A nematic liquid crystal was sealed between the substrates 2,6 of FIG. 1 so as to give a cell gap of 6 μm and $\Delta n \times d$ (birefringence×thickness of liquid crystal) of 0.68 μm. The film (a) 7 and the film (b) 8 were laminated onto each other so as to allow their stretching axes to fall at right angles with each other and the laminate was arranged between the liquid crystal cell 10 and the polarizing sheet 9 so that the maximum contrast was obtained.

The display characteristics of the liquid crystal display were examined under the conditions of 1/200 duty by using LC-5000 of Otsuka Denshi Co. Monochromatic display was obtained and the omnidirectional viewing angle was greatly improved. The wide viewing angle of at least 120° in total in the horizontal direction and at least 100° in total in the vertical direction was obtained. A line where contrast was 5 was taken as a borderline in the range of the viewing angle.

COMPARATIVE EXAMPLE 1

The characteristics of only the film (a) obtained in Example 1 were evaluated in the same manner obtained. Contrast at front ways was as low as 5. The measurement results of retardation are shown in Table 1.

COMPARATIVE EXAMPLE 2

The characteristics of only the film (b) obtained in Example 1 were evaluated in the same manner as in Example 1. Monochromatic display could not be obtained. Contrast at front ways was as low as 5. The measurement results of retardation are shown in Table 1.

COMPARATIVE EXAMPLE 3

The polycarbonate film obtained in Example 1 was 33% stretched by longitudinal uniaxial stretching at 175° C. using rollers having different peripheral speeds to obtain a birefringent film. The optical characteristics of the film are shown in Table 1.

The film was interposed between the liquid crystal cell and the polarizing sheet (on the side of the observer) of Example 1. The display characteristics of the liquid crystal cell were examined. When looked at front ways, monochromatic display could be almost achieved. However, when seen from an oblique direction, coloring was observed The viewing angle was narrow and 40° in total in the vertical direction and 50° in total in the horizontal direction.

COMPARATIVE EXAMPLE 4

The unstretched PSt film obtained in Example 1 was 35% stretched by longitudinal uniaxial stretching at 90° C. The optical characteristics of the film are shown in Table 1.

The display characteristics of the film were examined in the same manner as in Example 1. When looked at front ways, monochromatic display could be almost achieved. However, when incident light entered at an inclination, coloring was observed. The viewing angle (50° in total in the vertical direction and 40° in total in the horizontal direction) was narrow. The measurement results of retardation are shown in Table 1.

COMPARATIVE EXAMPLE 5

In a nearly similar manner to that of Example of JP-A-63-167304, a film laminate was obtained. Namely, a film of 300 μm composed of high-density polyethylene (Sumikasen Hard 2723, a product of Sumitomo Chemical Co., Ltd.) was subjected to longitudinal uniaxial stretching about 6 to 7 times as long at a roller temperature of 90° C. by using water for lubricating solution to obtain a film in which the measured value of retardation with a polarization microscope was about 1960 nm and a film in which the measured value of retardation was about 2530 nm. These films were laminated onto each other so as to allow their optical axes to fall at right angles with each other. The measured value of retardation with polarization microscope was 570 nm. The optical characteristics of the film laminate were examined by using Ellipsometer AEP100 using light beam of 632.8 nm in the same way as in Example 1. The results are shown in Table 1. The viewing angle was examined in the same way as Example 1 by using said film laminate. The viewing angle was 40° in total in the vertical direction and 45° in total in the horizontal direction.

EXAMPLE 2

Polyarylate having a molecular weight of about 200,000 was dissolved in methylene chloride to prepare a 20% solution. The solution was cast on a steel drum and continuously stripped off to obtain a transparent polyarylate film (PAr film) having a thickness of 90 μm, a width of 500 mm, a Tg of 185° and Δn° of 0.11. The film was 15% stretched by longitudinal uniaxial stretching at 190° C. using rollers having different peripheral speeds to obtain a film (a).

Separately, a styrene-acrylonitrile copolymer (acrylonitrile ratio: 35 wt. %) having a molecular weight of about 200,000 was dissolved in methylene dichloride solvent to prepare a 20% solution. The solution was cast on a steel drum and continuously stripped off to obtain a transparent ST/AN film having a thickness of 110 μm, a width of 500 mm, a Tg of 115° C. and Δn° of −0.05. The film was 32% stretched at 90° C. to obtain a film (b).

The films (a) and (b) were laminated onto each other so as to allow their stretching axes to fall at right angles with each other. Retardation was measured in the same way as in Example 1. The results are shown in Table 1.

The film laminate was inserted between the liquid crystal cell and the polarizing sheet (on the side of the observer) of Example 1 so as to allow the film (a) to be positioned on the side of the liquid crystal cell and at such an angle as to give the maximum contrast. The display characteristics of the resulting liquid crystal display were examined. Monochromatic display was obtained and omnidirectional viewing angle was greatly improved. A wide viewing angle of at least 120° in total in the horizontal direction and at least 100° in total in the vertical direction was obtained.

COMPARATIVE EXAMPLE 6

The characteristics of only the film (a) obtained in Example 2 were evaluated in the same manner as in Example 1. Monochromatic display could not be obtained. Contrast at front ways was as low as 5. The measurement results of retardation are shown in Table 1.

COMPARATIVE EXAMPLE 7

The characteristics of only the film (b) obtained in Example 2 were evaluated in the same manner as in Example 1. Monochromatic display could not be obtained. Contrast at front ways was as low as 5. The measurement results of retardation are shown in Table 1.

EXAMPLE 3

The films (a) and (b) were laminated onto each other so that the relative angle between the stretching axes was 70°. The display characteristics were examined in the same manner as in Example 1. Monochromatic display was obtained and omnidirectional viewing angle was greatly improved. A wide viewing angle of at least 110° in total in the horizontal direction and at least 110° in total in the vertical direction was obtained.

EXAMPLE 4

The phase differential film was removed from personal work processor PWP-LQX (manufacturer's serial number: 02G0000515) manufactured by Epson Co. and the film laminate obtained in Example 1 was inserted between the liquid crystal cell and the polarizing film so as to allow the stretching axis of the PC film to be vertically positioned and to allow the PC film to be positioned on the side of the liquid crystal cell. The display characteristics thereof were examined in the same manner as in Example 1. Clear monochromatic display was obtained and a wide viewing angle of at least 110° in total in the vertical direction and at least 100° in total in the horizontal direction was obtained.

COMPARATIVE EXAMPLE 8

The display characteristics of personal word processor PWP-LQX used in Example 7 were examined at the time of purchase. Though monochromatic display was obtained, the viewing angle was narrow and 50° in total in the vertical direction and 45° in total in the horizontal direction.

EXAMPLE 5

The unstretched polycarbonate film obtained in Example 1 was 18% stretched by longitudinal uniaxial stretching at 170° C. using rollers having different peripheral speeds to obtain a film (a).

Separately, the unstretched polystyrene film obtained in Example 1 was 16% stretched by longitudinal uniaxial stretching at 90° C. using rollers having different peripheral speeds to obtain a film (b).

The films (a) and (b) were laminated onto each other so as to allow their stretching axes to fall at right angles with each other. The stretching direction of the film (a) was referred to as $\theta=0$, and the stretching direction of the film (b) was referred to as $\theta=90°$. Retardation Re (40) was measured when incident light entered at an inclination at angle of 40° with the normal direction of the film laminate in the direction of $\theta=0$, $\theta=45°$ and $\theta=90°$. Retardation Re (0) in the normal direction was also measured. The rate of change in retardation $|Re(0)-Re(40)| \div |Re(0)|$ was calculated. The measurement of retardation was made by using AEP-100 (manufactured by Shimazu Corp.). Light source used was light beam having a wavelength of 632.8 nm. The measurement results are shown in Table 1.

The display characteristics of the liquid crystal display using the film laminate were evaluated in the same manner as in Example 4. Clear monochromatic display was obtained and a wide viewing angle of 75° in total in the vertical direction and 85° in total in the horizontal direction was obtained.

COMPARATIVE EXAMPLE 9

The characteristics of only the film (a) obtained in Example 5 were evaluated in the same manner as in Example 4. Satisfactory monochromatic display was not obtained and only a narrow viewing angle of 30° in horizontal direction was obtained. The measurement results of retardation are shown in Table 1.

COMPARATIVE EXAMPLE 10

Only the film (b) obtained in Example 5 was inserted between the liquid crystal cell and the polarizing sheet of Example 4 so as to allow its stretching axis to be horizontally kept. The display characteristics thereof was examined in the same manner as in Example 4. Contrast was 5 or below and monochromatic display was not obtained. The measurement results of retardation are shown in Table 1.

COMPARATIVE EXAMPLE 11

The uniaxially stretched film of the polycarbonate obtained in Comparative Example 3 and a biaxially stretched film of polystyrene (OPS-007, a product of Mitsubishi Monsant Chemical Co., Ltd.) were laminated onto each other so as to allow their longitudinal directions to accord with each other. The optical characteristics thereof were evaluated. The results are shown in Table 1.

The display characteristics of the liquid crystal display using said film laminate were examined in the same way as in Example 1. Monochromatic display was obtained and the viewing angle was greatly improved. A wide viewing angle of 110° in total in the horizontal direction and 100° in total in the vertical direction was obtained. However, the viewing angle was narrow in the oblique direction of halfway area both in the horizontal and vertical directions and coloring was observed.

TABLE 1

| | Re (0) (nm) | Value of $\|Re(0) - Re(4)\| \div \|Re(0)\|$ | | | Maximum Rate of Change of Re (%) |
|---|---|---|---|---|---|
| | | $\theta = 0$ | $\theta = 45°$ | $\theta = 90°$ | |
| Ex. 1 | 562 | 0.01 | 0 | 0.01 | 1 |
| Comp. Ex. 1 | 285 | 0.12 | 0 | 0.12 | 12 |
| Comp. Ex. 2 | 280 | 0.12 | 0.01 | 0.13 | 13 |
| Comp. Ex. 3 | 571 | 0.11 | 0.01 | 0.12 | 12 |
| Comp. Ex. 4 | 564 | 0.11 | 0.02 | 0.11 | 11 |
| Comp. Ex. 5 | 575 | 0.25 | 0.05 | 0.26 | 26 |
| Ex. 2 | 565 | 0.01 | 0 | 0 | 1 |
| Comp. Ex. 6 | 280 | 0.13 | 0.01 | 0.13 | 13 |
| Comp. Ex. 7 | 291 | 0.12 | 0.02 | 0.12 | 12 |
| Ex. 5 | 563 | 0.04 | 0.01 | 0.04 | 4 |
| Comp. Ex. 9 | 305 | 0.11 | 0.02 | 0.12 | 12 |
| Comp. Ex. 10 | 277 | 0.12 | 0.01 | 0.13 | 13 |
| Comp. Ex. 11 | 575 | 0.02 | 0.02 | 0.02 | 2 |

It will be understood from Examples and Table 1 that high-quality monochromatic display can be obtained at a wide viewing angle when the film laminate of the present invention is inserted between the liquid crystal cell and the polarizing sheet, said film laminate being obtained by laminating a uniaxially stretched film of a polymer having a positive intrinsic birefringence and a uniaxially stretched film of a polymer having a negative intrinsic birefringence onto each other so as to allow their stretching axes to fall at right angles with each other.

While the invention has been described in detail and with reference to specific embodiments thereof, it will be apparent to one skilled in the art that various changes and modifications can be made therein without departing from the spirit and scope thereof.

What is claimed is:

1. A liquid crystal display comprising a liquid crystal element, at least two birefringent films and a polarizing sheet so arranged that said films are held between said liquid crystal element and said polarizing sheet, characterized in that said birefringent films are composed of at least one uniaxially stretched film of a polymer having a positive intrinsic birefringence and light transmission properties and at least one uniaxially stretched film of a polymer having a negative intrinsic birefringence and light transmission properties, and wherein said uniaxially stretched film of a polymer having a positive intrinsic birefringence and light transmission properties and said uniaxially stretched film of a polymer having a negative intrinsic birefringence and light transmission properties are laminated onto each other so as to allow their stretching axes to fall at right angled with each other.

2. A liquid crystal display as claimed in claim 1, wherein said polymer having a positive intrinsic birefringence is a member selected from the group consisting of polycarbonates, polyarylates, polyethylene terephthalate, polyether sulfone, polyphenylene sulfide, polyphenylene oxide, polyallyl sulfone, polyamideimides, polyimides, polyolefins, polyvinyl chloride, cellulose and polyesters.

3. A liquid crystal display as claimed in claim 2, wherein said polymer having a positive intrinsic birefringence is a member selected from the group consisting of polycarbonates, polyarylates and polyesters.

4. A liquid crystal display as claimed in claim 1, wherein said polymer having a negative intrinsic birefringence is a member selected from the group consisting of styrene polymers, acrylic ester polymers, methacrylic ester polymers, acrylonitrile polymers and methacrylonitrile polymers.

5. A liquid crystal display as claimed in claim 4, wherein said polymer having a negative intrinsic birefringence is a styrene polymer.

6. A liquid crystal display as claimed in claim 1, wherein said at least one uniaxially stretched film of a polymer having a positive intrinsic birefringence and light transmission properties is a single film, and said at least one uniaxially stretched film of a polymer having a negative intrinsic birefringence and light transmission properties is a single film.

* * * * *